Figure 1:
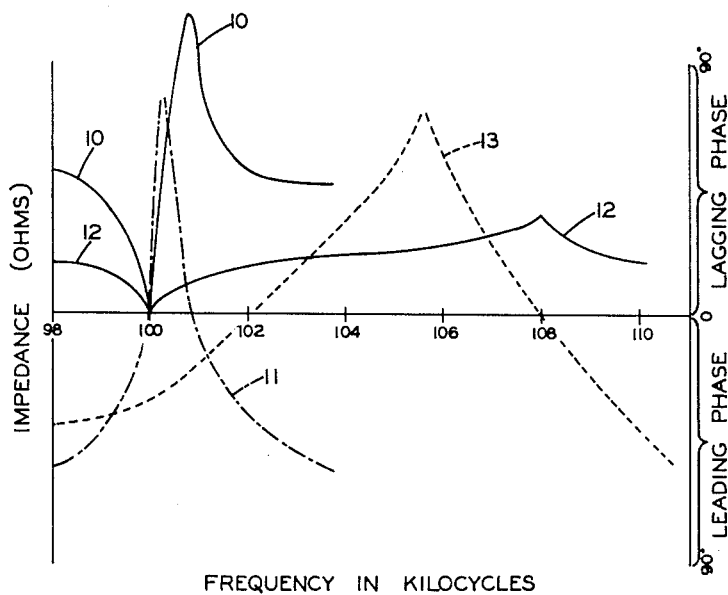

June 26, 1956    E. R. SARRATT    2,752,512
SONIC ENERGY SOURCE
Filed May 10, 1952    4 Sheets-Sheet 1

INVENTOR.
EVERETT R. SARRATT
BY Harry C. Page
ATTORNEY

June 26, 1956  E. R. SARRATT  2,752,512
SONIC ENERGY SOURCE
Filed May 10, 1952  4 Sheets-Sheet 4

INVENTOR.
EVERETT R. SARRATT
BY Harry C. Page
ATTORNEY

United States Patent Office 2,752,512
Patented June 26, 1956

2,752,512

SONIC ENERGY SOURCE

Everett R. Sarratt, Cleveland, Ohio, assignor, by mesne assignments, to Clevite Corporation, Cleveland, Ohio, a corporation of Ohio Application May 10, 1952, Serial No. 287,126

6 Claims. (Cl. 310—8.1)

The present invention relates to a source of sonic-energy radiation and particularly to such a source which will supply radiant energy of a relatively high frequency and amplitude to materials having different acoustical characteristics.

In many cases, it is desired to supply radiation from a source of sonic energy into a material in order to effect some change in a characteristic of the material. As used in this specification, the term "sonic energy" is intended to refer to frequencies above the audible range as well as frequencies within the range of audibility. Thus it has been proposed to use sonic energy in various industrial processes. For example, it has been found that in certain cases a polymer may be depolymerized, at least to some extent, by the use of sonic energy. Also, the use of sonic energy has been proposed to effect a distribution of small particles in a liquid vehicle and therefore provide a suspension with improved properties. In other cases, it has been proposed to utilize sonic energy in order to cause a coagulation of material which has been suspended in a liquid vehicle. The use of sonic energy has been found to be particularly desirable in some soldering operations.

One of the materials, which has been used to supply sonic energy for processes of the type mentioned above, is a ceramic comprised mainly of barium titanate which has been prepolarized by the application of an electrical voltage, all in a manner generally well understood by those skilled in the art. A ceramic transducer of the type under consideration, however, generally has the property of having a frequency constant which varies considerably with temperature. Thus a transducer of a given form may be resonant at a particular frequency for a particular temperature, but the frequency of resonance may vary considerably if the ambient temperature changes. Such a change in the characteristics of the ceramic material can cause a great deal of difficulty where it is desired to drive a transducer by an electronic circuit in order to provide a source of sonic radiation. The reason for this is that an oscillator designed to supply a given frequency to the transducer will be found to perform properly at one temperature but will not perform properly at other temperatures because of the change of resonant frequency of the ceramic transducer with temperature variations.

It is, of course, well known to utilize the resonant properties of certain materials to control the frequency of electronic oscillators. Thus quartz has found wide use for this purpose. It might be thought, therefore, that the ceramic transducer which is used to supply sonic energy to a material to be treated could also be used in the frequency-determining circuit of the oscillator in such a manner that the ceramic transducer would always be driven at the proper frequency. This type of operation is, however, not feasible for the reason that the loading of the ceramic transducer caused by the load to which it is coupled is effective to upset any frequency-controlling characteristics which it would normally have.

The reason for this is explained in more detail hereinafter. It would be very desirable, therefore, to provide a circuit arrangement for driving a sonic transducer which is not subject to these difficulties.

Applicant has discovered that the power factor of a ceramic utilized to supply sonic radiations of substantially maximum amplitude for a given amplitude of input to the transducer is substantially constant over a relatively wide range of temperature value. Applicant has further discovered that it is possible to use variations of the power factor to cause frequency changes in the driving oscillator which are effective to maintain the sonic energy applied to the load at a substantially constant value over a wide range of temperatures. In utilizing this effect, therefore, applicant has provided a source of sonic radiations comprising a transducer material which, per se, has rather undesirable temperature characteristics over the range of operation but which, when utilized in applicant's novel circuit, provides a stable operation over a rather wide temperature range.

It is an object of the invention, therefore, to provide an improved source of sonic radiations.

It is still another object of the invention to provide a source of sonic radiation which will supply, for a given amplitude of electrical input thereto, substantially maximum sonic energy to a load material coupled to the ceramic over rather wide range of temperatures.

It is still another object of the invention to provide a source of sonic radiation which uses a transducer comprised mainly of barium titanate and which will supply sonic radiations, over a relatively rather wide range of frequencies and of substantially maximum amplitude for a given amplitude of electrical input thereto, to a load material coupled to the barium titanate.

In accordance with the invention, a source of sonic radiations comprises a body of electromechanically sensitive material having a mechanical resonant frequency which varies with temperature changes of the body within a given temperature range and which, for an electrical excitation of a frequency in the vicinity of its resonant frequency, vibrates with maximum amplitude at temperatures within the given temperature range only when the power factor of the electrical excitation is substantially a predetermined value. A source of electrical excitation is coupled to the body of the aforementioned material to excite the body at a frequency in the vicinity of the mechanical resonant frequency. Means are provided responsive to the power factor of the electrical excitation of the body for developing a control signal. There is also provided means, responsive to the above-mentioned control signal, for controlling the frequency of the source of electrical excitation to maintain the power factor at substantially the predetermined value for a predetermined range of temperatures within the given temperature range. By this arrangement, the source of electrical excitation is caused to excite the body to vibrate with substantially maximum amplitude for all temperatures of the body within the predetermined range of temperatures.

Figure 3:
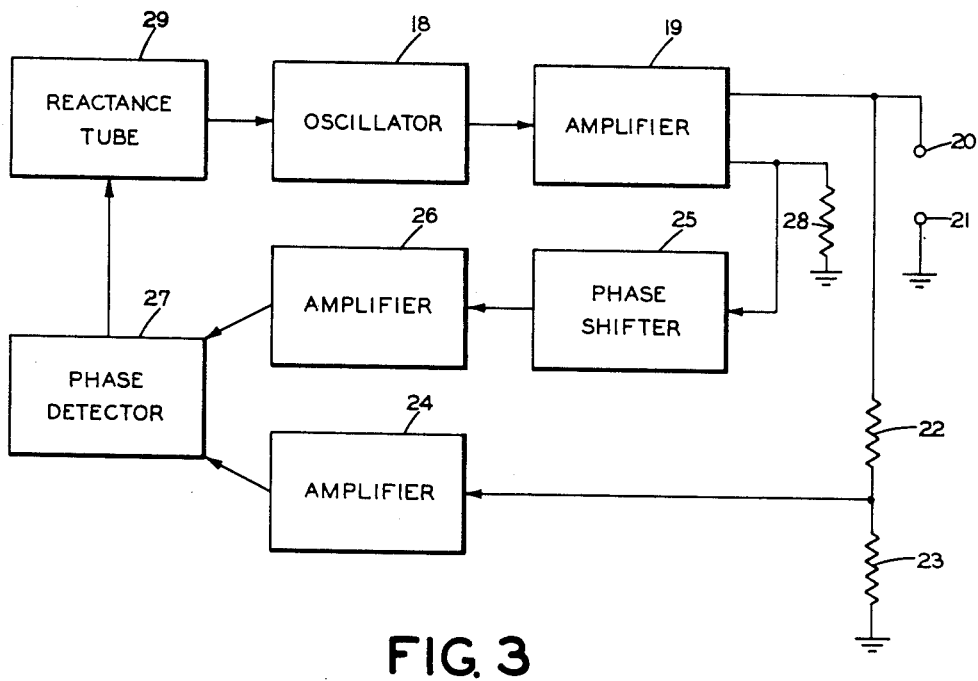
Figure 4:
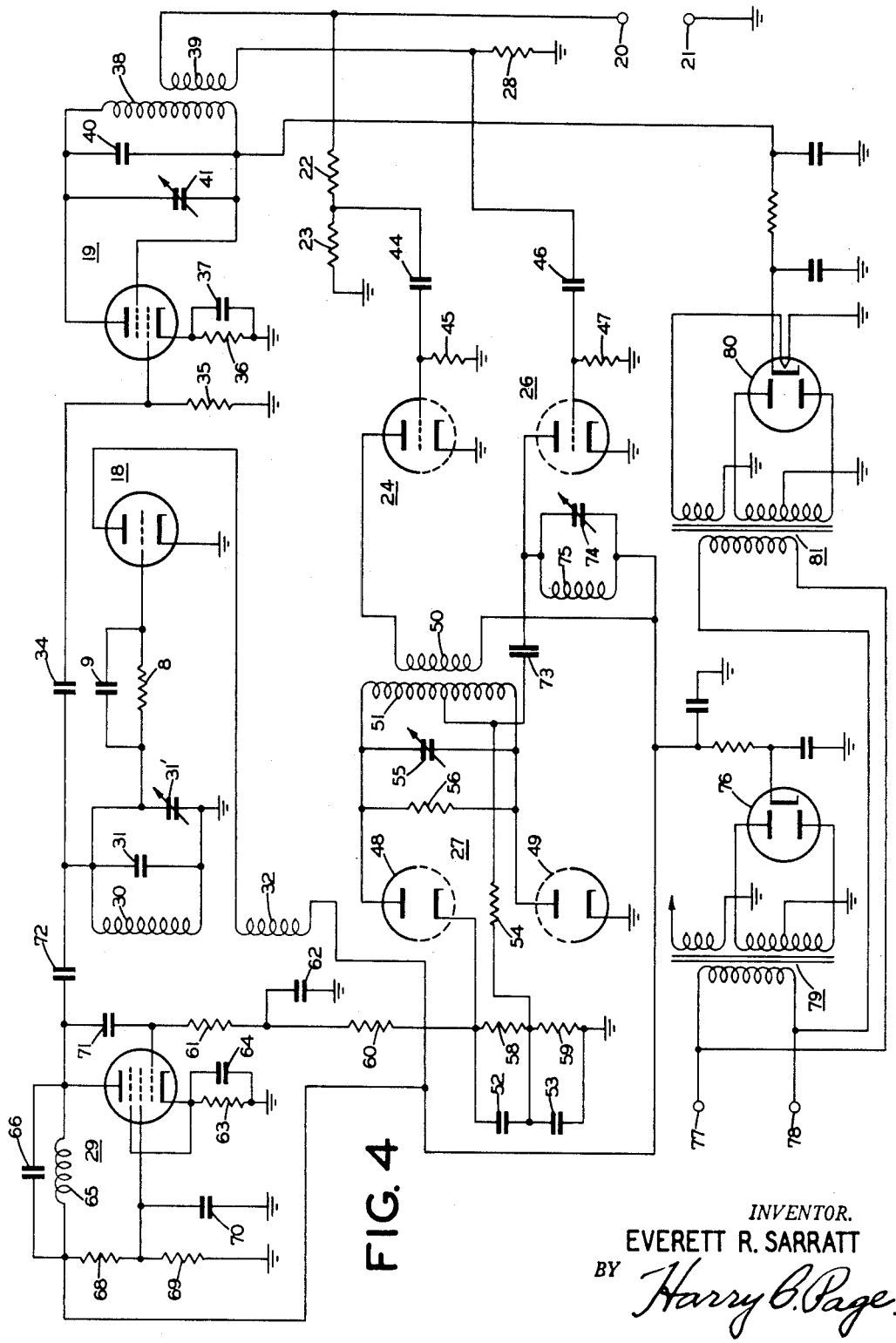
Figure 5:
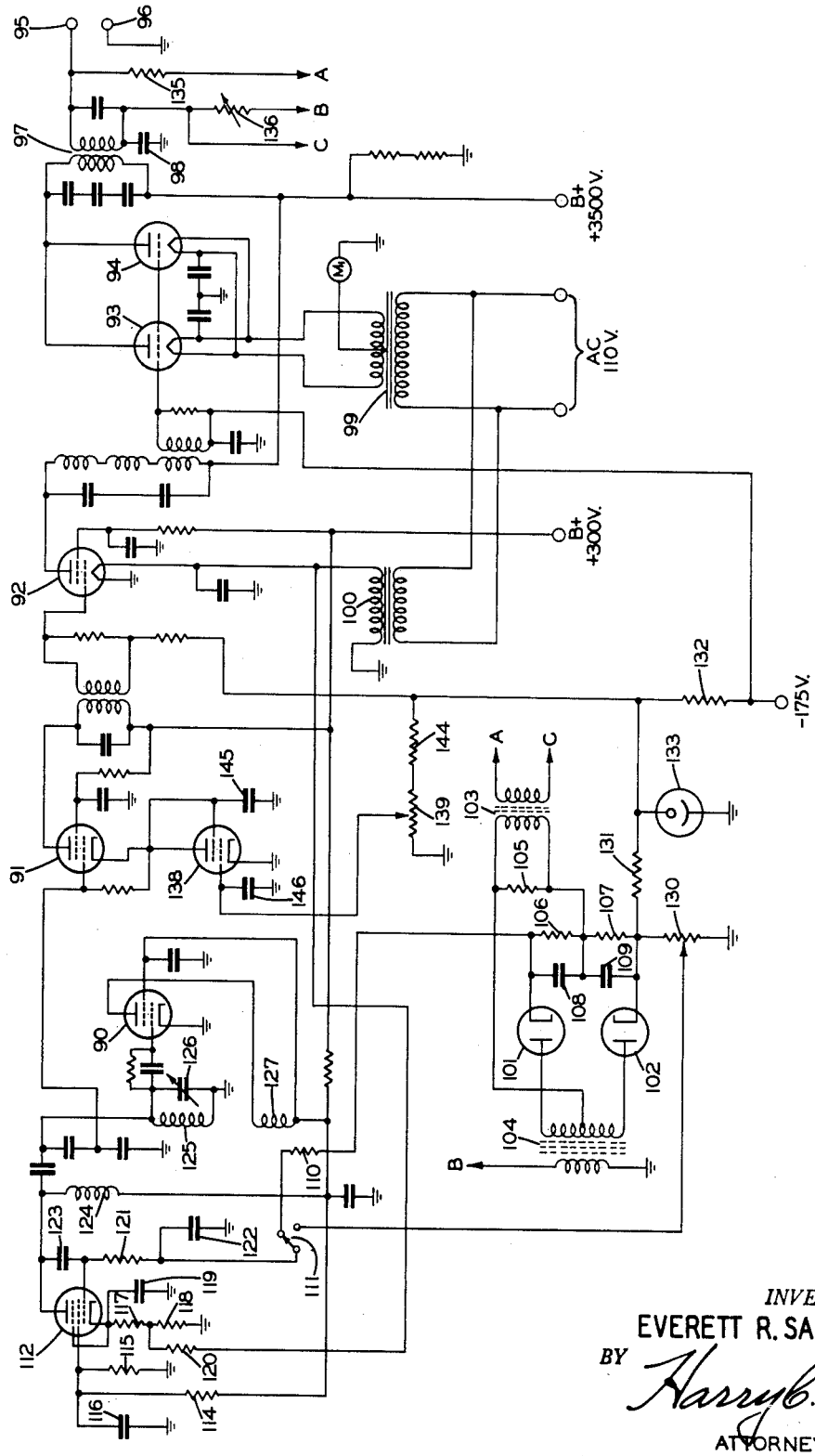

The novel features believed to be characteristic of the invention are set forth with particularity in the appended claims. The invention itself, however, both as to its organization and method of operation, together with other further objects and advantages thereof, will best be understood by reference to the specification taken in connection with the accompanying drawings, in which Figs. 1 and 2 comprise curves illustrating certain properties of the transducer material which is utilized in a preferred embodiment of the invention; Fig. 3 is a block diagram utilized in explaining the principles of operation of a preferred embodiment of the invention; and Figs. 4 and 5 are circuit diagrams of preferred embodiments of the invention.

Figure 2:
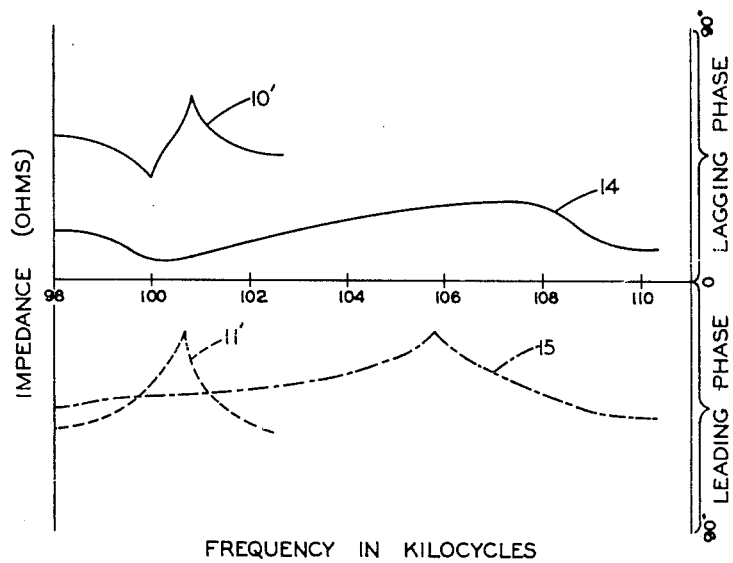

Reference is now made to the curves of Figs. 1 and 2 for an explanation of the reason why a ceramic transducer of the type here under consideration cannot be used as the frequency-determining element of its driving oscillator. Curve 10 of Fig. 1 shows the impedance characteristic of a typical quartz crystal when used as the frequency-determining element of a crystal-controlled oscillator. For the purposes of illustration, specific frequencies have been assigned to the abscissa (labeled kilocycles) while the ordinate shows the relative magnitude of the impedance of the crystal. Also shown on the same frequency scale is a curve 11, the ordinate of which shows the phase angle of the crystal having the impedance characteristic of curve 10. An oscillator utilizing such a quartz crystal as the frequency-determining circuit oscillates because the phase and amplitude of the oscillator feedback voltage are proper for sustained oscillations. Curve 10' of Fig. 2 illustrates the manner in which the impedance curve 10 of the quartz crystal under consideration changes if the crystal is loaded, or operated in some medium such as a liquid or against a solid body. A corresponding phase characteristic is shown in curve 11' of Fig. 2. It will be seen, therefore, from a comparison of these curves that the loading of the quartz crystal produces very major changes in the amplitude of its impedance characteristic and of its phase characteristic. As a matter of fact, it is well known that only a slight degree of loading is sufficient to render the crystal unsuitable as a frequency-controlling element in an oscillator circuit.

In curve 12 of Fig. 1 there is shown the impedance characteristic of a piece of barium titanate used as the frequency-controlling element of an oscillator circuit. A corresponding phase characteristic is shown in curve 13. Curves 12 and 13 for the barium titanate element under consideration, therefore, correspond generally to curves 10 and 11, respectively, representing the corresponding characteristics of the quartz crystal under consideration.

The manner in which the impedance and phase characteristics of the barium titanate transducer under consideration are changed when the transducer is loaded is illustrated by curves 14 and 15 of Fig. 2. Thus curve 14 shows the way the impedance characteristic 12 is degraded with loading and curve 15 shows the way the phase angle changes with loading. Here again it is seen that there are very major changes in the impedance and phase angle characteristics of the barium titanate element. These changes are such as to render the element totally unsuitable for use as the frequency-controlling element in the frequency-determining circuit of an oscillator under conditions where the transducer is loaded even to a moderate degree even if only an operation at a single frequency is considered. When there is added to this consideration the fact that a transducer which is delivering sonic energy into a load must generally operate over a relatively wide range of temperatures, it will be seen that the problem becomes very much more complicated. Added to these difficulties is the fact that barium titanate transducer elements, in themselves, have very greatly changed characteristics at various temperatures in the normal operating range of transducers supplying power to a given load or medium. Thus the capacitance of such barium titanate elements changes radically with temperature. Also the frequency constant of the resonant frequency of a specific transducer changes considerably with temperature over the normal operating range.

It was, therefore, prior to applicant's invention, very difficult to provide a source of sonic energy utilizing a barium titanate transducer element which was stable in operation over relatively long times and under various conditions of operation.

Applicant has discovered that a transducer of the general type under consideration here will operate with a substantially maximum amplitude over a relatively wide range of temperatures only when the power factor of the electrical excitation to the transducer is substantially a predetermined value. Furthermore, applicant has discovered that variations of this power factor in one direction or another can be used to provide a control effect which is suitable for changing the frequency of the driving oscillator to cause the oscillator output frequency to be varied so as to maintain the amplitude of vibration of the transducer substantially at the maximum value throughout a rather wide temperature range.

Fig. 3 illustrates one embodiment of the invention in a block-diagram form. Thus in Fig. 3 an oscillator 18 supplies oscillations to an amplifier 19 which in turn supplies power to a transducer (not shown) connected to terminals 20, 21. The transducer may be a body of electromechanically sensitive material having a mechanical resonant frequency which varies with temperature changes of the body within a given temperature range and which, for an electrical excitation of a frequency in the vicinity of its resonant frequency, vibrates with maximum amplitude at temperatures within this given temperature range only when the power factor of its electrical excitation is substantially a predetermined value. The body, in one very simple case, may be a block of polycrystalline ceramic material which has been prepolarized by the application thereto of a high D. C. voltage, in a manner which is generally well understood in the art. Transducers of this general type, but operated with a D. C. voltage applied, are shown and described in Patent No. 2,592,703, granted on April 15, 1952, on an application of Hans Jaffe, filed April 9, 1947. A method of polarizing ceramic transducers of the type here under discussion is described in Patent No. 2,486,560, granted on November 1, 1949, to Robert B. Gray, on an application filed on September 20, 1946.

The oscillator 18 thus is a source of electrical excitation coupled to the body of material at terminals 20, 21 to excite the body at a frequency in the vicinity of its mechanical resonant frequency. The arrangement of Fig. 3 also includes means responsive to the power factor of this electrical excitation for developing a control signal. Thus a voltage proportional to the potential across terminals 20, 21 is supplied from a center tap of a voltage divider 22, 23 to an amplifier 24 and a voltage proportional to the current supplied to the transducer connected to terminals 20, 21 is provided across the resistor 28. This last-named voltage is applied through a phase shifter 25 to amplifier 26. A phase detector 27 is utilized to derive from the output of amplifiers 24 and 26 a control signal responsive to the power factor of the electrical excitation supplied to the transducer connected across terminals 20, 21. The arrangement of Fig. 3 also comprises means responsive to the control signal generated by phase detector 27 for controlling the frequency of oscillator 18 to maintain the power factor at terminals 20, 21 at substantially the above-mentioned predetermined value for a predetermined range of temperatures within the range of temperatures over which the transducer operates satisfactorily when its power factor is substantially a predetermined value. Specifically, the output of phase detector 27 is utilized to control the reactance value supplied by a reactance tube 29 to the frequency-determining circuit of oscillator 18. The phase shifter 25 is provided for the purpose of adjusting the power factor of the excitation at terminals 20, 21 about which the phase detector 27 exercises its control. Thus, in operation, the phase shifter 25 is designed to introduce such a phase shift into the circuit that the phase detector 27 controls the power factor at terminals 20, 21 to the desired value.

In Fig. 4 there is shown a complete circuit diagram of a preferred embodiment of the invention. Circuit elements which are similar to those of Fig. 3 bear identical reference numerals, and circuit components which correspond generally to elements in block diagram form in Fig. 3 are indicated by similar reference numerals underlined. Thus the transducer of Fig. 4 is connected across terminals 20, 21. The oscillator 18 comprises a frequency-determining circuit which includes an inductance 30 and a parallel-connected condenser 31. Suitable feedback for the oscillator 18 is provided by an inductance 32 in the anode circuit of the oscillator tube and inductively coupled to inductance 30. The amplifier 19 has its input circuit connected to the oscillator 18 through a coupling condenser 34 and grid-leak resistor 35. A resistor 36 and parallel-connected condenser 37 are included in the cathode circuit of the tube of amplifier 19. The anode circuit of the tube of amplifier 19 includes a transformer having a primary winding 38 and a secondary winding 39. Primary winding 38 is tuned by condenser 40 across which is connected a trimmer condenser 41. Winding 39 of transformer 38, 39 is connected across the terminal 20, 21 through the resistor 28.

The tube of amplifier 24 has its input circuit connected to the junction of resistors 22 and 23 through a coupling condenser 44 and a grid-leak resistor 45. Similarly, the input circuit of the tube of amplifier 26 is connected across resistor 28 by a coupling condenser 46 and a grid-leak resistor 47.

The phase responsive circuit 27 includes a pair of diodes 48, 49 and a transformer having windings 50, 51. The output voltage of the amplifier 24 is applied with opposite polarity to the diodes 48, 49 through the transformer 50—51. The output voltage of the amplifier 26 is applied with the same polarity to the anodes of diodes 48 and 49 by means of a connection of the anode of the tube of amplifier 26 with the mid tap of secondary winding 51. The cathode of tube 49 is directly grounded and the cathode of tube 48 is grounded for alternating currents through condensers 52, 53. A resistor 54 is utilized to connect the common terminal of condensers 52 and 53 with the mid-point of the secondary winding 51. An adjustable condenser 55 is connected in parallel with a resistor 56 across the secondary winding 51. Resistors 58 and 59 are connected across condensers 52 and 53, respectively.

The cathode of tube 48 is connected to the grid of the reactance tube 29 by means of resistors 60, 61 which have their common junction connected to ground through a bypass condenser 62. The reactance tube 29 includes a resistor 63, connected in parallel with a condenser 64, in its cathode circuit. The tube is a pentode and the suppressor grid is also connected to the cathode. The output circuit of the tube includes inductance 65 in parallel with a condenser 66. A D. C. operating voltage is applied to the second grid of reactance tube 29 by means of a voltage divider 68, 69, resistor 69 being bypassed to ground by a condenser 70. A condenser 71 is connected between the anode and first grid of the reactance tube and the anode of the reactance tube is also coupled to the common junction of inductance 30 and condenser 31 through a coupling condenser 72.

The phase shift necessary for the operation of the device of Fig. 4, corresponding generally to the phase shift provided by element 25 of Fig. 3, is provided by a tuned circuit including an inductance 75 and a parallel-connected adjustable condenser 74 in the anode circuit of the tube of amplifier 24 and the tuned circuit 51, 55. A blocking condenser 73 is interposed in the connection from the phase-shifting circuit 74—75 to the phase responsive circuit 27 to prevent application of the anode supply potential of amplifier 26 to the diodes and other components of the phase responsive circuit.

The remaining portion of the circuit of Fig. 4 is a power supply for the portion already described and comprises a double-diode rectifier 76 connected to a suitable power source at terminals 77, 78 through a transformer indicated generally by the reference numeral 79. In order to supply a suitable operating voltage for the tube of amplifier 19, a second diode-rectifier tube 80 is provided. Tube 80 is also connected to terminals 77, 78 but through its own transformer, indicated generally by the reference numeral 81.

The operation of the circuit of Fig. 4 will be apparent from the description which has been given with reference to the block diagram of Fig. 3.

The circuit of Fig. 4 has been used to control a ceramic transducer comprised mainly of barium titanate coupled to terminals 20, 21, the transducer having a capacitance of about 700 mmf. and requiring a leading power factor for proper operation of about 38°. The nominal operating frequency of this arrangement was 100 kilocycles at 26° C.

The embodiment of the invention illustrated in Fig. 5 represents a preferred arrangement which has been used for supplying larger amounts of power to an ultrasonic transducer than can be supplied by the embodiment of Fig. 4. This arrangement comprises an oscillator including vacuum tube 90. The output of this oscillator is coupled through an amplifier and amplitude-control tube 91 to a vacuum-tube amplifier 92 which feeds an output stage including tubes 93 and 94 connected in parallel. A transducer, which is not shown, may be coupled to terminals 95 and 96. The output circuit of the power amplifiers 93 and 94 is connected through a transformer 97 to the terminals 95 and 96, a coupling condenser 98 being used between one side of the secondary winding of transformer 97 and ground. The primary and secondary windings of the transformer 97 are tuned by suitable condensers to a frequency at the midpoint of the range of operation of the device. Similar tuning is used in the output circuits of tubes 91 and 92. The portion of Fig. 5, which has so far been described, is generally conventional and will not be described in detail. Transformer 99 is utilized to supply filament power to the tubes 93 and 94 and a transformer 100 is used to supply filament power to the tube 92.

The portion of the circuit of Fig. 5 which is utilized to generate a control voltage in order to maintain the power factor of the input to the transducer connected to terminals 95 and 96 at a substantially constant value is considerably more simple than that of the arrangement of Fig. 4. This circuit includes a pair of diodes 101 and 102. A voltage proportional to the voltage across the terminals 95 and 96 is derived from the terminals indicated C and A in the righthand portion of the drawing and is applied to the correspondingly marked terminals of a transformer 103. This voltage is applied to the cathode of tubes 100 and 102 with the same polarity. A voltage proportional to the current supplied to the transducer is provided at the terminal B in the righthand portion of the figure and is supplied through the correspondingly marked terminal at the lefthand portion of the figure to the transformer 104. This voltage is supplied, through the secondary winding of the transformer 104, with opposite polarity to the anodes of the diodes 101 and 102. A resistor 105 is connected across the secondary winding of transformer 103 and series-connected resistors 106 and 107, respectively, shunted by condensers 108 and 109, are connected between the cathodes of diodes 101 and 102. An output voltage from the phase detector is supplied through a resistor 110 to one stationary contact point of a single-pole double-throw switch 111.

The reactance-control tube circuit of Fig. 5 includes a tube 112 which again is a pentode having the suppressor grid connected to the cathode. In order to provide a reactance tube effect, a positive voltage is connected to the second grid of the tube from a suitable source indicated at B+ through a resistor 114. This grid is grounded through resistor 115 which in turn is shunted by a condenser 116. The cathode circuit of the reactance tube 112 includes series-connected resistors 117 and 118 between the cathode and ground, these resistors being in turn shunted by a condenser 119. A line frequency voltage is supplied to the common point of resistors 117 and 118 through a resistor designated by the reference numeral 120 to provide a small frequency variation about the mean frequency. This is done to minimize standing waves in the substances being treated by the transducer. The control grid of tube 112 is connected to the movable contact point of switch 111 through a resistor 121, one terminal of which is connected to ground through a condenser 122. A condenser 123 is connected between the anode and control grid of tube 112. This tube is supplied with an operating potential through an inductance 124 from a source indicated generally as B+.

The anode of tube 112 is connected to the frequency-determining circuit of the oscillator including tube 90, this frequency-determining circuit including an inductance 125 and variable capacitor 126. An inductance 127 is utilized to provide a suitable feedback voltage for the oscillator.

In order to provide a manual control for the frequency of the circuit described, a resistor 130 is connected between one end of resistor 131 and ground and a variable tap on the resistor 130 is connected to the remaining stationary contact point of switch 111. The cathode of diode 102 is connected to a negative voltage source (indicated —175 v.) through series-connected resistors 131 and 132. A gas-filled tube 133 is connected between the common terminal of resistors 131 and 132 and ground.

In order to introduce into the circuit stable phase shifts for driving the particular titanate transducer for which the circuit of Fig. 5 was designed, there is provided a resistor 135 connected between terminal 95 and the terminal designated A as well as a variable resistor 136 between the lower terminal of the secondary winding of transformer 97 and the terminal indicated B.

The only remaining portion of the circuit of Fig. 5 which has not been mentioned is that which comprises the vacuum tube 138. This tube has a cathode which is grounded and an anode which is connected to the cathode of tube 91. The control grid of the tube 138 is supplied with a suitable control voltage from a potential divider which includes resistors 139 and 144 connected in series with the resistor 132 to the voltage source indicated —175 v. The screen grid of tube 138 is connected to the anode of the tube and is by-passed for alternating currents to ground through a condenser 145. The control grid of the tube is connected to ground through resistor 139 and is coupled to ground through a condenser 146.

In considering the operation of the circuit which has just been described, it will be understood that the operation is generally similar to that which has been described with reference to the block diagram of Fig. 3. Thus the oscillator including tube 90 provides a voltage which is amplified in tubes 91, 92, 93, 94 and supplied to the transducer connected at terminals 95 and 96. The control circuit, including the diodes 101 and 102, provides a control voltage for the reactance tube 112, which reactance tube in turn varies the frequency of the oscillator 90 when the switch 111 is in the position shown. The resistors 135 and 136 and the condenser 98 effectively introduce into the circuit a phase shift which causes the control circuit effectively to control the power factor of the energy supplied to the transducer connected to the terminals 95 and 96 at about the value which was determined to be correct for the particular transducer utilized. When the switch 111 is thrown to its other position, the automatic control circuit is made ineffective, and the reactance tube 112 can be controlled by means of the variable tap on resistor 130 in order to provide a manual control of the frequency supplied to the transducer connected to terminals 95 and 96. The tube 138 is provided in order to provide a variable output from tube 91. Thus the output of tube 91 is varied when the adjustable tap on resistor 139 is moved. The gas-filled tube 133 is provided as a regulator, effectively to regulate the potential at the cathode of tube 102.

The operation of the portion of the circuit of Fig. 5 including the oscillator and the amplifiers 91, 92, 93 and 94 will be readily understood by those skilled in the art, and it is thought that it is unnecessary to give circuit constants for this portion of the circuit. However, the circuit constants for the remaining portion of the circuit are somewhat critical and thus will be listed in order to illustrate the method of practicing the preferred embodiment of the invention illustrated in Fig. 5.

For supplying energy to a barium titanate element having capacitance of approximately .04 mfd. with a power factor of substantially 40 degrees, the following circuit constants were utilized:

Tubes: Type
101 ------------------------------------ 6AL5
102 ------------------------------------ 6AL5
112 ------------------------------------ 6AH6

Resistors:
106 ----------------------------kilohms__ 47
107 --------------------------------do____ 47
110 ----------------------------megohms__ 1
120 ----------------------------ohms___ 1500
117 --------------------------------do____ 100
118 --------------------------------do____ 47
121 --------------------------------do____ 2200
130 --------------------------------do____ 2500
131 ----------------------------kilohms__ 47
132 --------------------------------do____ 68
135 ----------------------------ohms___ 4000
136 --------------------------------do____ 150

Condensers:
98 --------------------------microfarads__ 2
108 --------------------------------do____ 0.005
109 --------------------------------do____ 0.005
116 --------------------------------do____ 0.1
119 --------------------------------do____ 0.1
122 --------------------------------do____ 1
123 ----------------micromicrofarads____ 20

Transformers:
104 Pri.—100 T #36 enamel on ½" ferrite core
    Sec.—300 TCT #36 enamel wound on top Pri.
103 Pri.—100 T #36 enamel on ½" ferrite core
    Sec.—150 T #36 enamel wound on top Pri.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A source of sonic radiations, comprising: a body of electromechanically sensitive material, having a mechanical resonant frequency which varies with temperature changes of said body within a given temperature range, and having the property at temperatures within said temperature range, under electrical excitation at a frequency in the vicinity of said resonant frequency, of vibrating with maximum amplitude only when the power factor of said electrical excitation is substantially a predetermined value; a source of electrical excitation, coupled to said body of said material to excite said body at a frequency in the vicinity of said mechanical resonant frequency, and including frequency-varying means adapted in response to a control signal to vary said frequency of excitation within limits permitting substantial compensation for said resonant frequency variations within said given temperature range; means, responsive primarily only to the power factor of said electrical excitation of said body, for developing a control signal when changes of temperature cause said power factor to deviate from said predetermined value; and means for applying said control signal to said frequency-varying means to adjust the frequency of said source of electrical excitation to maintain said power factor at substantially said predetermined value with resultant excitation of said body to vibrate with substantially maximum amplitude at all temperatures within said predetermined range of temperatures.

2. A source of sonic radiations, comprising: a body of electromechanically sensitive material, having a mechanical resonant frequency which varies with temperature changes of said body within a given temperature range, and having the property at temperatures within said temperature range, under electrical excitation at a frequency in the vicinity of said resonant frequency, of vibrating with maximum amplitude only when the power factor of said electrical excitation is substantially a predetermined value but of vibrating with a very much reduced amplitude when said power factor is substantially different from said predetermined value; a source of electrical excitation, coupled to said body of said material to excite said body at a frequency in the vicinity of said mechanical resonant frequency, and including frequency-varying means adapted in response to a control signal to vary said frequency of excitation within limits permitting substantial compensation for said resonant frequency variations within said given temperature range; means, responsive primarily only to the power factor of said electrical excitation of said body, for developing a control signal when changes of temperature cause said power factor to deviate from said predetermined value; and means for applying said control signal to said frequency-varying means to adjust the frequency of said source of electrical excitation to maintain said power factor at substantially said predetermined value with resultant excitation of said body to vibrate with substantially maximum amplitude at all temperatures within said predetermined range of temperatures.

3. A source of sonic radiations, comprising: a body of electromechanically sensitive material, having a mechanical resonant frequency which varies with temperature changes of said body within a given temperature range, and having the property at temperatures within said temperature range, under electrical excitation at a frequency in the vicinity of said resonant frequency, of vibrating with maximum amplitude only when the power factor of said electrical excitation is substantially a predetermined value; a source of electrical excitation, coupled to said body of said material to excite said body at a frequency in the vicinity of said mechanical resonant frequency, and including frequency-varying means adapted in response to a control signal to vary said frequency of excitation within limits permitting substantial compensation for said resonant frequency variations within said given temperature range; means, responsive primarily only to the power factor of said electrical excitation of said body, for developing a control signal having a magnitude which increases correspondingly when changes of temperature cause deviations of said power factor from said predetermined value and having a polarity which depends upon the direction of said deviation of said power factor from said predetermined value; and means for applying said control signal to said frequency-varying means to adjust the frequency of said source of electrical excitation to maintain said power factor at substantially said predetermined value with resultant excitation of said body to vibrate with substantially maximum amplitude at all temperatures within said predetermined range of temperatures.

4. A source of sonic radiations, comprising: a body of electromechanically sensitive material, having a mechanical resonant frequency which varies with temperature changes of said body within a given temperature range, and having the property at temperatures within said temperature range, under electrical excitation at a frequency in the vicinity of said resonant frequency, of vibrating with maximum amplitude only when the power factor of said electrical excitation is substantially a predetermined value; an oscillator having a frequency-determining circuit and coupled to said body of said material to provide electrical excitation thereto at a frequency in the vicinity of said mechanical resonant frequency; a reactance tube coupled to said frequency-determining circuit and adapted in response to a control signal to vary the operating frequency of said oscillator and thus vary said frequency of excitation within limits permitting substantial compensation for said resonant frequency variations within said given temperature range; means responsive to the power factor of said electrical excitation of said body for developing a control signal when changes of temperature cause said power factor to deviate from said predetermined value; and means for applying said control signal to said reactance tube to vary the output reactance thereof for adjusting said operating frequency of said oscillator to maintain said power factor at substantially said predetermined value with resultant excitation of said body to vibrate with substantially maximum amplitude at all temperatures within said predetermined range of temperatures.

5. A source of sonic radiations, comprising: a body of electromechanically sensitive polycrystalline ceramic material, having a mechanical resonant frequency which varies with temperature changes of said body within a given temperature range, and having the property at temperatures within said temperature range, under electrical excitation at a frequency in the vicinity of said resonant frequency, of vibrating with maximum amplitude only when the power factor of said electrical excitation is substantially a predetermined value; a source of electrical excitation, coupled to said body of said material to excite said body at a frequency in the vicinity of said mechanical resonant frequency, and including frequency-varying means adapted in response to a control signal to vary said frequency of excitation within limits permitting substantial compensation for said resonant frequency variations within said given temperature range; means, responsive primarily only to the power factor of said electrical excitation of said body, for developing a control signal when changes of temperature cause said power factor to deviate from said predetermined value; and means for applying said control signal to said frequency-varying means to adjust the frequency of said source of electrical excitation to maintain said power factor at substantially said predetermined value with resultant excitation of said body to vibrate with substantially maximum amplitude at all temperatures within said predetermined range of temperatures.

6. A source of sonic radiations, comprising: a body of electromechanically sensitive barium titanate material, having a mechanical resonant frequency which varies with temperature changes of said body within a given temperature range, and having the property at temperatures within said temperature range, under electrical excitation at a frequency in the vicinity of said resonant frequency, of vibrating with maximum amplitude only when the power factor of said electrical excitation is substantially a predetermined value; a source of electrical excitation, coupled to said body of said material to excite said body at a frequency in the vicinity of said mechanical resonant frequency, and including frequency-varying means adapted in response to a control signal to vary said frequency of excitation within limits permitting substantial compensation for said resonant frequency variations within said given temperature range; means, responsive primarily only to the power factor of said electrical excitation of said body, for developing a control signal when changes of temperature cause said power factor to deviate from said predetermined value; and means for applying said control signal to said frequency-varying means to adjust the frequency of said source of electrical excitation to maintain said power factor at substantially said predetermined value with resultant excitation of said body to vibrate with substantially maximum amplitude at all temperatures within said predetermined range of temperatures.

References Cited in the file of this patent

UNITED STATES PATENTS

| | | |
|---|---|---|
| 2,274,262 | Wolff | Feb. 24, 1942 |
| 2,462,799 | Young et al. | Feb. 22, 1949 |
| 2,480,646 | Grabau | Aug. 30, 1949 |
| 2,486,265 | Dennis | Oct. 25, 1949 |
| 2,588,094 | Eaton | Mar. 4, 1952 |

OTHER REFERENCES

Proc. I. E. E., vol. 97, issue 49, pp. 285–289 (September 1950).